US012570072B2

(12) United States Patent
Bao

(10) Patent No.: US 12,570,072 B2
(45) Date of Patent: Mar. 10, 2026

(54) ANTI-SCRATCH ANTI-REFLECTION MODULE, METHOD FOR MANUFACTURING THE SAME AND DISPLAY MODULE

(71) Applicant: Shenzhen China Star Optoelectronics Semiconductor Display Technology Co., Ltd., Guangdong (CN)

(72) Inventor: Aibing Bao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 530 days.

(21) Appl. No.: 18/071,728

(22) Filed: Nov. 30, 2022

(65) Prior Publication Data

US 2024/0157678 A1 May 16, 2024

(30) Foreign Application Priority Data

Nov. 16, 2022 (CN) .......................... 202211432006.7

(51) Int. Cl.
| | |
|---|---|
| B32B 15/08 | (2006.01) |
| B32B 9/00 | (2006.01) |
| B32B 27/18 | (2006.01) |
| G02B 1/111 | (2015.01) |
| G02B 1/14 | (2015.01) |

(52) U.S. Cl.
CPC ............... *B32B 15/08* (2013.01); *B32B 9/00* (2013.01); *B32B 27/18* (2013.01); *G02B 1/111* (2013.01); *G02B 1/14* (2015.01); *B32B*

*2250/04* (2013.01); *B32B 2311/00* (2013.01); *B32B 2363/00* (2013.01); *B32B 2367/00* (2013.01); *B32B 2379/08* (2013.01); *B32B 2383/00* (2013.01)

(58) Field of Classification Search
None
See application file for complete search history.

(56) References Cited

FOREIGN PATENT DOCUMENTS

| | | |
|---|---|---|
| CN | 105315879 | 2/2016 |
| JP | 2006-227344 | 8/2006 |
| JP | 2008-184515 | 8/2008 |

OTHER PUBLICATIONS

Descision of Rejection Dated Sep. 15, 2024 From The State Intellectual Property Office of the People's Republic of China Re. Application No. 202211432006.7 and Its Translation Into English. (18 Pages).
Notification of Office Action and Search Report Dated Aug. 1, 2024 From The State Intellectual Property Office of the People's Republic of China Re. Application No. 202211432006.7 and Its Translation Into English. (19 Pages).

*Primary Examiner* — James C Yager

(57) ABSTRACT

An anti-scratch anti-reflection module, a manufacturing method for the same, and a display panel are provided. The anti-scratch anti-reflection module includes a substrate, a reflective index control layer, and a hardening layer. The reflective index control layer is disposed on a surface of the substrate. The hardening layer is disposed on a surface of the reflective index control layer away from the substrate. Material of the reflective index control layer includes metal oxide.

9 Claims, 3 Drawing Sheets

| preparing a solution of the hardening layer | S11 |

| preparing a solution of the reflective index control layer | S12 |

| forming the reflective index control layer on the substrate | S13 |

| forming the hardening layer on the reflective index control layer | S14 | forming the reflective index control layer on the substrate — S21 preparing a solution of the hardening layer — S22 forming the hardening layer on the reflective index control layer — S23

ANTI-SCRATCH ANTI-REFLECTION MODULE, METHOD FOR MANUFACTURING THE SAME AND DISPLAY MODULE

CROSS-REFERENCE TO RELATED PATENT APPLICATION

This application claims the benefit of priority of Chinese patent application No. 202211432006.7, titled "ANTI-SCRATCH ANTI-REFLECTION MODULE, METHOD FOR MANUFACTURING THE SAME AND DISPLAY MODULE" and filed on Nov. 16, 2022 with the China National Intellectual Property Administration, which is incorporated by reference in the present application in its entirety.

FIELD OF DISCLOSURE

The present disclosure relates to the field of display technology, and more particularly, to an anti-scratch anti-reflection module, a method for manufacturing the same, and a display module.

BACKGROUND OF DISCLOSURE

A display is often scratched in use, and image clarity of the display is also affected by external light sources. Therefore, a surface of the display is required to be processed for two purposes. One of the purposes is to enhance mechanical performances of the display, including hardness and scratch-resistibility, so that the display is scratch-resistant, and another one of the purposes is to reduce reflection of the external light sources to enhance the image clarity.

A conventional method for manufacturing an anti-reflection coating is to deposit a layer of hard coating on a substrate, and then deposit anti-reflection coating thereon. A reflective index of the anti-reflection coating generally has to be low, which is difficult to be achieved through simple resin coating. Generally, it is necessary to introduce mesoporous or hollow nanoparticles, and the mesoporous or hollow nanoparticles are, on one hand, having lower density than a resin itself, and, on the other hand, in order to be effectively dispersed in a resin system, required to be modified on surfaces. Furthermore, since surface energy of the modifier is relatively low, these nanoparticles are preferentially deposited on the surfaces, so that the resin on the surface cannot be effectively cross-linked, so that even a substrate undergoes a hardening process, mechanical performances of the anti-reflection coating are still under-qualified. Generally, a hardness of the anti-reflection coating is less than 2H, and an abrasion resistance is less than 10 cycles, which does not meet requirements for the mechanical performances of the display.

SUMMARY

The present invention provides an anti-scratch anti-reflection module, a method for manufacturing the same, and a display module, so as to solve a problem of insufficient mechanical performances, insufficient scratch resistance, and low hardness of conventional reflective coatings.

The present invention provides an anti-scratch anti-reflection module including: a substrate, a reflective index control layer, and a hardening layer. The reflective index control layer is disposed on a surface of the substrate. The hardening layer is disposed on a surface of the reflective index control layer away from the substrate. Material of the reflective index control layer includes metal oxide.

Furthermore, material of the hardening layer includes materials in parts by weight as follow: 100 parts by weight of photocurable resin; 1 to 10 parts by weight of photoinitiator; 0.1 to 1 part by weight of cross-linking agent; to 40 parts by weight of photopolymerizable monomer; and 1000 to 10000 parts by weight of solvent.

Furthermore, the photopolymerizable monomer has a ring structure, and a glass transition temperature of the photopolymerizable monomer is greater than or equal to 80° C.

Furthermore, the photopolymerizable monomer includes at least one of isobornyl acrylate, isobornyl methacrylate, or tricyclodecane dimethanol diacrylate.

Furthermore, a functionality of the photocurable resin is greater than or equal to 5. A functionality of the cross-linking agent is greater than or equal to 2.

Furthermore, the photocurable resin includes at least one of polyester acrylic resin, polyurethane acrylic resin, epoxy acrylic resin, or polysilsesquioxane. The cross-linking agent includes at least one of polycyanamide cross-linking agent, epoxy cross-linking agent, or isocyanate initiator.

Furthermore, the photoinitiator includes at least one of biphenyl ketal photoinitiator, α,α-dialkoxyacetophenone photoinitiator, α-hydroxyalkylphenone photoinitiator, α-aminoalkylphenone photoinitiator, or acylphosphine oxide photoinitiator.

Furthermore, the metal oxide has forms of a plurality of particles, and a particle size of the plurality of particles ranges from 10 to 100 nanometers (nm). A reflexive index of the particulate metal oxide is greater than 1.5 and less than 3.

The present invention further provides a method for manufacturing the anti-scratch anti-reflection module, the method including steps as follow:

forming the reflective index control layer on the substrate, and the material of the reflective index control layer includes the metal oxide;

preparing a solution of the hardening layer; and coating the solution of the hardening layer on the reflective index control layer to form the hardening layer.

The present invention further provides a display module including:

a display panel including a display surface; and the anti-scratch and anti-reflection module as mentioned above, and the anti-scratch and anti-reflection module is disposed on the display surface of the display panel.

Compared with the prior art, for the anti-scratch anti-reflection module, the method for manufacturing the same, and the display module of the present invention, the hardening layer and the reflective index control layer in the anti-scratch anti-reflection module provided by embodiments of the present invention can facilitate enhancing of the mechanical performances of the display module, thereby enhancing surface hardness and abrasion resistance of the display module, and further enhancing anti-scratch performance of the surface of the display module, so as to prevent the display module from being scratched in use.

BRIEF DESCRIPTION OF DRAWINGS

In order to describe technical solutions in the present invention clearly, drawings to be used in the description of embodiments will be described briefly below. Obviously, drawings described below are only for some embodiments of the present invention, and other drawings can be obtained by those skilled in the art based on these drawings without creative efforts.

DETAILED DESCRIPTION OF PRESENT EMBODIMENTS

Figure 1:
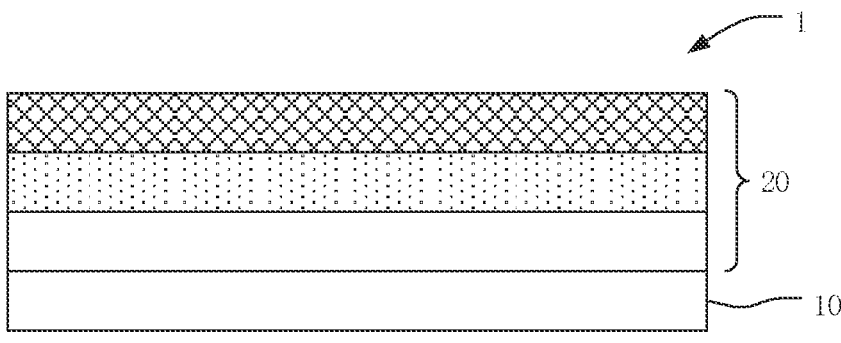
FIG. 1 is a schematic view of a layered structure of a display module provided by a first embodiment of the present invention.

A preferred embodiment of the present invention will be introduced with reference to appended drawings as follows to demonstrate that the present invention can be implemented. The embodiment of the present invention can be fully introduced to those skilled in the art to make technical contents clearer and easier to understand. The present invention can be embodied in many different forms of embodiment, and the scope of protection of the present invention is not limited to the embodiments set forth herein.

In the appended drawings, structurally identical components are designated by the same reference numerals, and structurally or functionally similar components throughout are designated by similar numerical reference numerals. The dimensions and thicknesses of each component shown in the drawings are arbitrarily shown. The size and thickness of each component are not limited, and for the sake of clarity, the thickness of the components is exaggerated somewhat in some places in the drawings.

Direction terms mentioned by the present invention, for example "upper," "lower," "front," "rear," "left," "right," "inner," "outer," "side," etc. are merely directions in the appended drawings for only explaining and illustrating the present invention. The orientation or positional relationship is only for the convenience of describing the present invention and simplifying the description, and does not indicate or imply that the device or element referred to must have a specific orientation, structure and operation in a specific orientation, and should not be viewed as limitations of the present invention. In addition, terms "first," "second," and "third" are used for descriptive purposes only, and cannot be understood as indicating or implying relative importance or implicitly indicating the number of technical features indicated.

When some part is described to be "on" another part, the part can be directly disposed on the other part; alternatively, an intervening part can exist, the part is disposed on the intervening part, and the intervening part is disposed on the other part. When a part is described to be "installed on" or "connected to" another part, it can be understood that the parts are directly "installed" or "connected" to each other, alternatively it is understood that one part is "installed" or "connected" to the other part through an intervening part.

First Embodiment

In an embodiment of the present invention, a display module 1 is provided. As shown in FIG. 1, the display module 1 includes a display panel 10 and an anti-scratch anti-reflection module 20 covering a display surface of the display panel 10. The display panel 10 is configured for displaying images, and the anti-scratch anti-reflection module 20 is configured for protecting the display surface of the display panel 10 and reducing reflection of external light on the display surface of the display panel 10.

Figure 2:
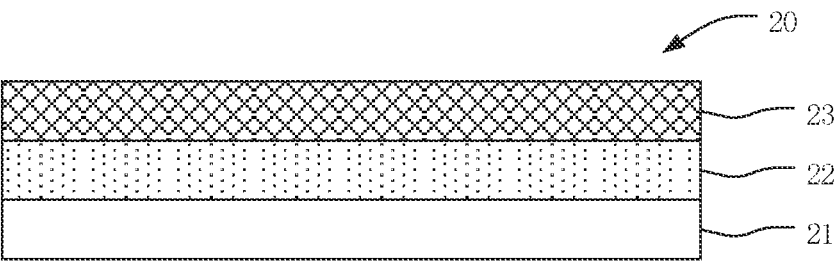
FIG. 2 is a schematic view of a layered structure of anti-scratch anti-reflection module provided by the first embodiment of the present invention.

As shown in FIG. 2, the anti-scratch anti-reflection module 20 includes a substrate 21, a reflective index control layer 22, and a hardening layer 23. The reflective index control layer 22 is disposed on a surface of the substrate 21 away from the display panel 10, and by refracting the external light, an incident angle of the external light is changed through the reflective index control layer 22, thereby preventing the external light from affecting the display effect of the display module 1, and enhancing image definition of the display module 1. The hardening layer 23 is disposed on a surface of the reflective index control layer 22 away from the substrate 21, and the hardening layer 23 is configured for protecting a surface of the display module 1 and preventing the display module 1 from scratches caused by rubbing when in use, which increases a service life of the display module 1 and a display effect of a screen.

A reflective index of the anti-scratch anti-reflection module 20 can be adjusted through adjusting film thicknesses and reflective indices of film layers included therein, so as to achieve the best anti-reflection effect. Specifically, the film thickness and the reflective index of each of the film layers in the anti-scratch anti-reflection module 20 can be represented by following equations:

$$n_1 n_2 = n_0 n_3 \text{ or } n_2^2 n_0 = n_1^2 n_3; \text{ and}$$

$$n_1 d_1 = n_2 d_2 = (m+1/2)\lambda/2;$$

wherein, $n_0$ is the reflective index of air, $n_1$ is a reflective index of the hardening layer 23, $n_2$ is a reflective index of the reflective index control layer 22, and $n_3$ is a reflective index of the substrate 21; $d_1$ is a film thickness of the hardening layer 23, and $d_2$ is a film thickness of the reflective index control layer 22; and m is an integer greater than or equal to 0.

Preferably, a thickness of the reflective index control layer 22 and a thickness of the hardening layer 23 are both less than 100 nanometers (nm), the reflective index of the hardening layer 23 ranges from 1.5 to 1.55, and the reflective index of the reflective index control layer 22 ranges from 1.8 to 1.9.

The substrate 21 is a plastic substrate made of at least one of cellulose triacetate (TAC) or polyethylene terephthalate (PET). In other embodiments of the present invention, the substrate 21 can also be a glass substrate, a polarizer, etc. Materials of the hardening layer 23 includes 100 parts by weight of photocurable resin, 1 to 10 parts by weight of photoinitiator, 0.1 to 1 part by weight of cross-linking agent, 10 to 40 parts by weight of photopolymerizable monomer, and 1000 to 10000 parts by weight of solvent. The reflective index control layer 22 can be manufactured by adding 1500 to 15000 parts by weight of metal particles to the materials of the hardening layer 23 through a roll coating process.

Specifically, a functionality of the photocurable resin is greater than or equal to 5. The greater the functionality of the photocurable resin, the greater a cross-linking density. Therefore, mechanical performances of the hardening layer 23 can be enhanced. The photocurable resin can be at least one of polyester acrylic resin, polyurethane acrylic resin, epoxy acrylic resin, or polysilsesquioxane.

The photoinitiator can be at least one of biphenyl ketal photoinitiator, α,α-dialkoxyacetophenone photoinitiator, α-hydroxyalkylphenone photoinitiator, α-aminoalkylphenone photoinitiator, or acylphosphine oxide photoinitiator. In addition, a maximum absorption wavelength of the photoinitiator should match an emission spectrum of an ultraviolet (UV) light source.

A functionality of the cross-linking agent is greater than or equal to 2. the cross-linking agent can include at least one of melamine cross-linking agent, epoxy cross-linking agent, or isocyanate initiator.

The photopolymerizable monomer has a ring structure, and a glass transition temperature of the photopolymerizable monomer is greater than or equal to 80° C. The higher the glass transition temperature of the photopolymerizable monomer, the greater rigidity of molecular chain segments of the photopolymerizable monomer, which can also enhance the mechanical performances of the hardening layer 23. Therefore, the glass transition temperature of the photopolymerizable monomer is greater than or equal to 80° C. In addition, a molecular structure of the photopolymerizable monomer includes a ring structure, and the photopolymerizable monomer with the ring structure has greater rigidity, which can further enhance the mechanical performances of the hardening layer 23. The photopolymerizable monomer can be at least one of isobornyl acrylate, isobornyl methacrylate, or tricyclodecane dimethanol diacrylate.

Since a solution having a boiling point lower than 50° C. has high volatility, a solid content of resin in the hardening layer 23 and a layer-thickness of the hardening layer 23 are affected by volatilization of solvent, and a solvent having a boiling point higher than 150° C. affects drying speed and difficulty of the hardening layer 23, production efficiency, and cost effectiveness. Therefore, a solvent with a boiling point ranging from 50° C. to 150° C. is selected, such as at least one of ethyl acetate, isopropanol, toluene, butanone, or water.

The reflective index of the metal particles is greater than 1.8, and a particle diameter of the metal particles ranges from 10 nm to 100 nm. The metal particles can be metal oxides such as at least one of zirconium oxide, titanium oxide, zinc oxide, cerium oxide, yttrium oxide, or antimony pentoxide. Mechanical performances of the metal oxides are superior to mesoporous or hollow nanoparticles, which can enhance the mechanical performances of the anti-scratch anti-reflection module 20 while having excellent refraction effects.

Figure 3:
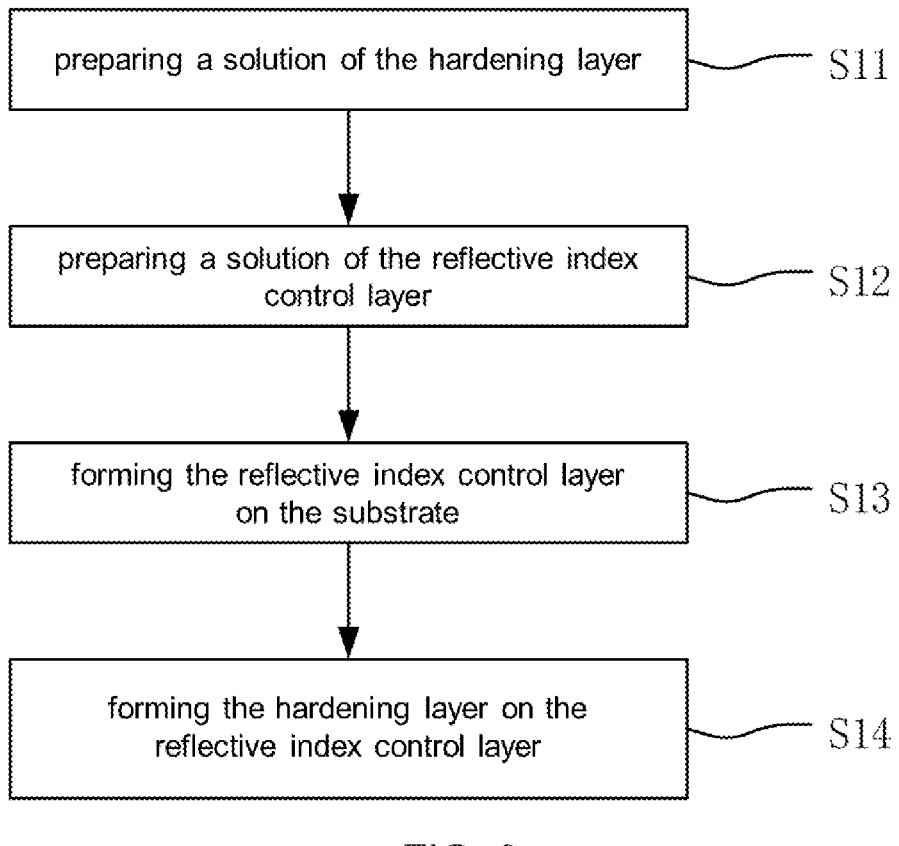
FIG. 3 is a flowchart of a method for manufacturing the anti-scratch anti-reflection module provided by the first embodiment and a second embodiment of the present invention.

Furthermore, an embodiment of the present invention provides a method for manufacturing the anti-scratch anti-reflection module 20, which is utilized to manufacture the above-mentioned anti-scratch anti-reflection module 20. The method for manufacturing the anti-scratch anti-reflection module 20 is shown in FIG. 3, which includes steps S11 to S14.

Step S11: preparing a solution of the hardening layer 23:

Adding 5 grams of pentaerythritol triacrylate and 10 grams of ethyl acetate in a first container to form a first mixed solution; adding 4 grams of isophorone diisocyanate, 10 grams of ethyl acetate, and 0.04 gram of dibutyltin dilaurate in a second container to form a second mixed solution; dripping the second mixed solution in the second container into the first container, and having the first mixed solution and the second mixed solution react in a nitrogen environment at 40° C. for 6 hours to form a reacted solution; and Mixing and stirring 7 grams of hexa-functional epoxy-modified acrylic resin, 2 grams of the reacted solution, 1 gram of isobornyl acrylate, 0.05 gram of 2,4,6-trimethyl-benzoyl-diphenylphosphine oxide photoinitiator, and 490 grams of ethyl acetate together to form the solution of the hardening layer 23. A solid content of the solution of the hardening layer 23 is 2%, and viscosity of the solution of the hardening layer 23 is 1.23 cps.

Step S12: preparing a solution of the reflective index control layer 22: Adding 10 grams of zirconia dispersion liquid (with a particle size of 15 nm and a solid content of 30%) and 140 grams of ethyl acetate to 100 grams of the solution of the hardening layer 23 mentioned above, and stirring to form the solution of the reflective index control layer 22. A solid content of the solution of the reflective index control layer 22 is 2%, and viscosity of the solution of the reflective index control layer 22 is 1.67 cps.

Step S13: forming the reflective index control layer 22: preparing the substrate 21, uniformly roll-coating a layer of the solution of the reflective index control layer 22 on the surface of the substrate 21, and solidifying the solution of the index regulating layer 22 on the substrate 21 after completing roll-coating, so as to form the reflective index control layer 22. A thickness of the reflective index control layer 22 is 73 nm, and a reflective index of the reflective index control layer 22 is 1.89.

Step S14: forming the hardening layer 23: uniformly roll-coating a layer of the solution of the hardening layer 23 on the surface of the reflective index control layer 22 away from the substrate 21, and solidifying the solution of the hardening layer 23 on the reflective index control layer 22 after completing roll-coating, so as to form the hardening layer 23. A thickness of the hardening layer 23 is 89 nm, and a reflective index of the hardening layer 23 is 1.55.

Figure 4:
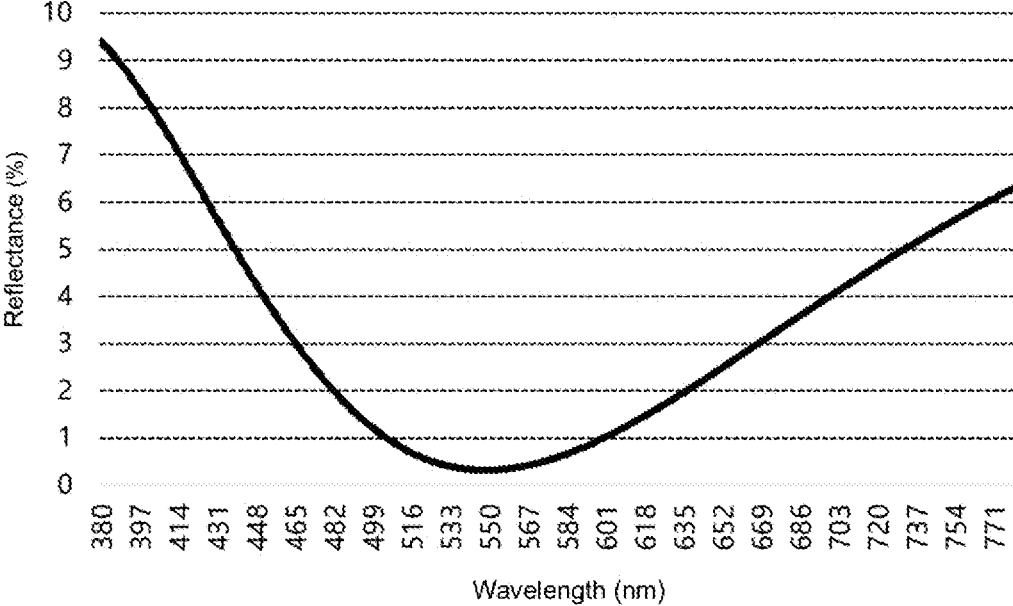
FIG. 4 is a reflectance spectrum in all wavelengths of the anti-scratch anti-reflection module provided by the first embodiment of the present invention.

As shown in FIG. 4, the anti-scratch anti-reflection module 20 manufactured in this embodiment of the present invention adopts metal oxide materials with a high reflective index (e.g., greater than 1.5) to change an incident angle of external incident light, thereby preventing the external incident light from affecting display light, thereby enhancing the display effect of the display module 1. In addition, the anti-scratch anti-reflection module 20 has a reflectance less than 0.5% for light at 550 nm, and the reflectance can even be 0.34%. The anti-scratch anti-reflection module 20 has an excellent anti-reflection effect which enhances image clarity of the display module 1. Furthermore, the hardening layer 23 and the reflective index control layer 22 in the anti-scratch anti-reflection module 20 can greatly facilitate enhancing of the mechanical performances of the display module 1, thereby enhancing surface hardness and abrasion resistance of the display module 1, and further enhancing anti-scratch performance of the surface of the display module, so as to prevent the display module 1 from being scratched in use.

Second Embodiment

An embodiment of the present invention provides a method for manufacturing the anti-scratch anti-reflection module 20, which is utilized to manufacture the above-mentioned anti-scratch anti-reflection module 20. The method for manufacturing the anti-scratch anti-reflection module 20 is shown in FIG. 3, which includes steps S11 to S14.

Step S11: preparing a solution of the hardening layer 23:

Adding 5 grams of hydrophilic silicon dioxide dispersion liquid and 90 grams of toluene in a first container to form a first mixed solution; adding 5 grams of monoalkoxy unsaturated fatty acid titanate and 10 grams of toluene in a second container to form a second mixed solution; dripping the second mixed solution in the second container into the first container, and having the first mixed solution and the second mixed solution react in a nitrogen environment at 70° C. for 8 hours to form a reacted solution.

Mixing 7 grams of nona-functional polyester modified acrylic resin, 1 gram of the reacted solution, 2 grams of isobornyl methacrylate, 0.05 gram of 1-hydroxycyclohexyl phenyl ketone, and 490 gram of methyl ethyl ketone together, and stirring to form the solution of the hardening layer 23. A solid content of the solution of the hardening layer 23 is 2%, and a viscosity of the solution of the hardening layer 23 is 3.88 cps.

Step S12: preparing a solution of the reflective index control layer 22: Adding 8 grams of zirconia dispersion liquid (with a particle size of 15 nm and a solid content of 30%) and 112 grams of methyl ethyl ketone to 100 grams of the solution of the hardening layer 23 mentioned above, and stirring to form the solution of the reflective index control layer 22. A solid content of the solution of the reflective index control layer 22 is 2%, and viscosity of the solution of the reflective index control layer 22 is 2.69 cps.

Step S13: forming the reflective index control layer 22 on a substrate 21: preparing a substrate 21, and uniformly roll-coating a layer of zirconia (with the particle size of 15 nm and the solid content of 30%) on a surface of the substrate 21 to form the reflective index control layer 22. A thickness of the reflective index control layer 22 is 74 nm, and a reflective index of the reflective index control layer 22 is 1.87.

Step S14: forming the hardening layer 23 on the reflective index control layer 22: uniformly roll-coating a layer of the solution of the hardening layer 23 on the surface of the reflective index control layer 22 away from the substrate 21, and solidifying the solution of the hardening layer 23 on the reflective index control layer 22 after completing roll-coating, so as to form the hardening layer 23. A thickness of the hardening layer 23 is 90 nm, and a reflective index of the hardening layer 23 is 1.53.

The anti-scratch anti-reflection module 20 in this embodiment of the present invention also has an excellent anti-reflection effect which enhances image clarity of the display module 1. Furthermore, the hardening layer 23 and the reflective index control layer 22 in the anti-scratch anti-reflection module 20 in this embodiment can also greatly facilitate enhancing of the mechanical performances of the display module 1, thereby enhancing surface hardness and abrasion resistance of the display module 1, and further enhancing anti-scratch performance of the surface of the display module, so as to prevent the display module 1 from being scratched in use.

Third Embodiment

In an embodiment of the present invention, an anti-scratch anti-reflection module 20 is provided. A film structure of the anti-scratch anti-reflection module 20 is similar to that of the anti-scratch anti-reflection module provided in the first embodiment, differences lie in that the reflective index control layer 22 in this embodiment of the present invention is formed by evaporating a layer of metal oxide. A particle size of metal particles in the metal oxide ranges from 10 nm to 100 nm, and the reflective index of the metal oxide is greater than 1.8. The metal particles can be at least one of zirconia, titanium oxide, zinc oxide, cerium oxide, yttrium oxide, or antimony pentoxide.

Figure 5:
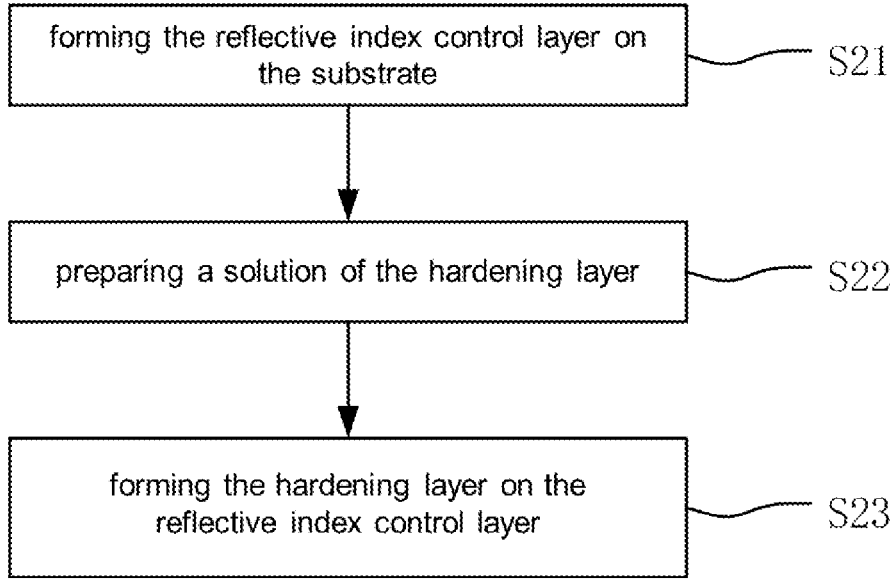
FIG. 5 is a flowchart of a method for manufacturing the anti-scratch anti-reflection module provided by a third embodiment of the present invention.

Furthermore, an embodiment of the present invention provides a method for manufacturing the anti-scratch anti-reflection module 20, which is utilized to manufacture the anti-scratch anti-reflection module 20 mentioned above. The method for manufacturing the anti-scratch anti-reflection module 20 is shown in FIG. 5, which includes steps S21 to S23.

Step S21: forming the reflective index control layer 22 on a substrate 21: preparing a substrate 21, and depositing a layer of zirconia (with the particle size of 15 nm) on a surface of the substrate 21 to form the reflective index control layer 22. A reflective index of the reflective index control layer 22 is 1.83.

Step S22: preparing a solution of the hardening layer 23:

Adding 6 grams of acrylic modified polysilsesquioxane, 3 grams of pentaerythritol tetraacrylate, 1 gram of tricyclodecane dimethanol diacrylate, 0.05 gram of 1,1'-(methylene di-4,1-phenylene)bis[2-hydroxyl-2-methyl-1-acetone] photoinitiator, and 490 grams of isopropanol in a reacting container, and stirring to form the solution of the hardening layer 23. A solid content of the solution of the hardening layer 23 is 2%, and a viscosity of the solution of the hardening layer 23 is 2.56 cps.

Step S23: forming the hardening layer 23 on the reflective index control layer 22: uniformly roll-coating a layer of the solution of the hardening layer 23 on the surface of the reflective index control layer 22 away from the substrate 21, and solidifying the solution of the hardening layer 23 on the reflective index control layer 22 after completing roll-coating, so as to form the hardening layer 23. A thickness of the hardening layer 23 is 92 nm, and a reflective index of the hardening layer 23 is 1.5.

The anti-scratch anti-reflection module 20 in this embodiment of the present invention also has an excellent anti-reflection effect which enhances image clarity of the display module 1. Furthermore, the hardening layer 23 and the reflective index control layer 22 in the anti-scratch anti-reflection module 20 in this embodiment can also greatly facilitate enhancing of the mechanical performances of the display module 1, thereby enhancing surface hardness and abrasion resistance of the display module 1, and further enhancing anti-scratch performance of the surface of the display module, so as to prevent the display module 1 from being scratched in use.

Comparative Experiments

Comparative examples are anti-reflection coatings containing mesoporous or hollow nanoparticles.

The anti-reflection coatings in the comparative examples and the anti-scratch anti-reflection module 20 manufactured in the first, second, and third embodiments of the present invention were respectively subjected to anti-reflection effect test, coating film hardness pencil measurement, and steel wool abrasion resistance test. All test data are shown in Table 1 below.

TABLE 1

|  | 550 Reflectance (%) | Pencil Hardness Rating | Abrasion Resistance |
|---|---|---|---|
| 1st Embodiment | 0.34 | 4H | 50 cycles |
| 2nd Embodiment | 0.36 | 5H | 55 cycles |
| 3rd Embodiment | 0.34 | 6H | 70 cycles |
| Comparative Exp. | 0.30 | HB | 5 cycles |

According to the data in Table 1, it can be seen that the hardness of the anti-scratch anti-reflection modules provided by the first, second, and third embodiments of the present invention can reach the highest level of 6H, and no scratch is formed for at least 50 cycles under the abrasion of steel wool. However, the hardness of the anti-reflection coatings provided in the existing comparative examples can only reach the HB level, and scratches appear after only 5 cycles under the abrasion of steel wool.

Therefore, the anti-scratch anti-reflection modules provided in the embodiments of the present invention have great mechanical performances, can effectively protect display panels, prevent scratches on the surface of the display panels, thereby enhancing a service life of the display module and the image quality of the display effect, which enhances user experiences.

Although the present invention herein has been described with reference to particular embodiments, it should be understood that these embodiments are merely illustrative of the principles and applications of the present invention. It is therefore to be understood that numerous modifications can be made to the illustrative embodiments and that other arrangements can be devised without departing from the spirit and scope of the present invention as defined by the appended claims. It will be appreciated that the various dependent claims and the features set forth therein can be combined in different ways than presented in the initial claims. It will also be appreciated that the features described in connection with individual embodiments can be shared with others of the described embodiments.

What is claimed is:

1. An anti-scratch and anti-reflection module, comprising:
a substrate;
a reflective index control layer disposed on a surface of the substrate; and
a hardened layer disposed on a surface of the reflective index control layer away from the substrate;
wherein material of the reflective index control layer comprises metal oxide, and material of the hardened layer comprises materials in parts by weight as follow:
100 parts by weight of photocurable resin;
1 to 10 parts by weight of photoinitiator;
0.1 to 1 part by weight of cross-linking agent;
10 to 40 parts by weight of photopolymerizable monomer; and
1000 to 10000 parts by weight of solvent.

2. The anti-scratch and anti-reflection module according to claim 1, wherein the photopolymerizable monomer has a ring structure, and a glass transition temperature of the photopolymerizable monomer is greater than or equal to 80° C.

3. The anti-scratch and anti-reflection module according to claim 2, wherein the photopolymerizable monomer comprises at least one of isobornyl acrylate, isobornyl methacrylate, or tricyclodecane dimethanol diacrylate.

4. The anti-scratch and anti-reflection module according to claim 1, wherein a functionality of the photocurable resin is greater than or equal to 5;
wherein a functionality of the cross-linking agent is greater than or equal to 2.

5. The anti-scratch and anti-reflection module according to claim 4, comprising:
the photocurable resin comprises at least one of polyester acrylic resin, polyurethane acrylic resin, epoxy acrylic resin, or polysilsesquioxane;
the cross-linking agent comprises at least one of polycyanamide cross-linking agent, epoxy cross-linking agent, or isocyanate initiator.

6. The anti-scratch and anti-reflection module according to claim 1, wherein the photoinitiator comprises at least one of biphenyl ketal photoinitiator, $\alpha$, $\alpha$-dialkoxyacetophenone photoinitiator, $\alpha$-hydroxyalkylphenone photoinitiator, $\alpha$-aminoalkylphenone photoinitiator, or acylphosphine oxide photoinitiator.

7. The anti-scratch and anti-reflection module according to claim 1, wherein the metal oxide has forms of a plurality of particles, and a particle size of the plurality of particles ranges from 10 to 100 nanometers (nm);
wherein a reflexive index of the particulate metal oxide is greater than 1.5 and less than 3.

8. A method for manufacturing the anti-scratch and anti-reflection module as claimed in claim 1, comprising following steps:
forming the reflective index control layer on the substrate, and the material of the reflective index control layer comprises the metal oxide;
preparing a solution of the hardening layer; and
coating the solution of the hardening layer on the reflective index control layer to form the hardening layer.

9. A display module, comprising:
a display panel comprising a display surface; and
the anti-scratch and anti-reflection module as claimed in claim 1, wherein the anti-scratch and anti-reflection module is disposed on the display surface of the display panel.

* * * * *